March 11, 1924.
B. H. MOSSINGHOFF
1,486,447
AUTOMOBILE GEAR SHIFT
Filed Feb. 25, 1922
2 Sheets-Sheet 1
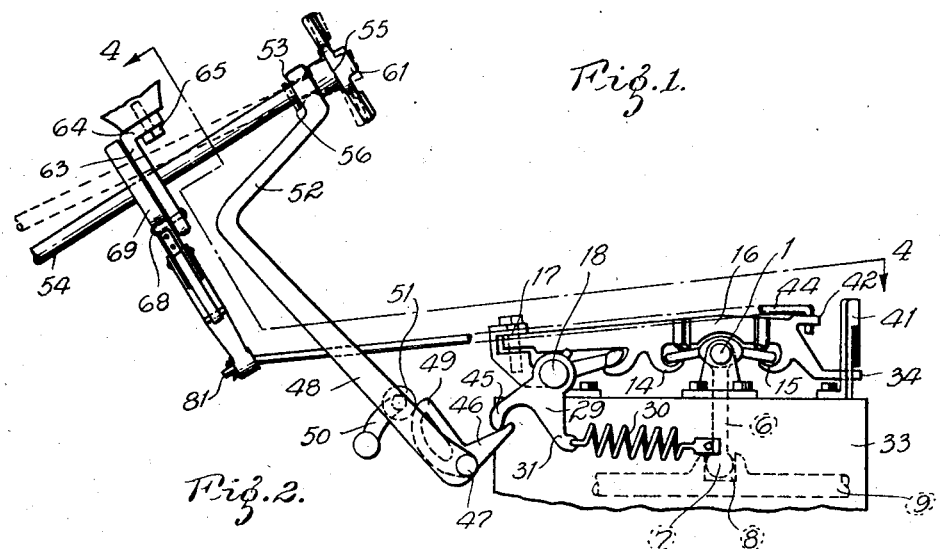
Fig.1.
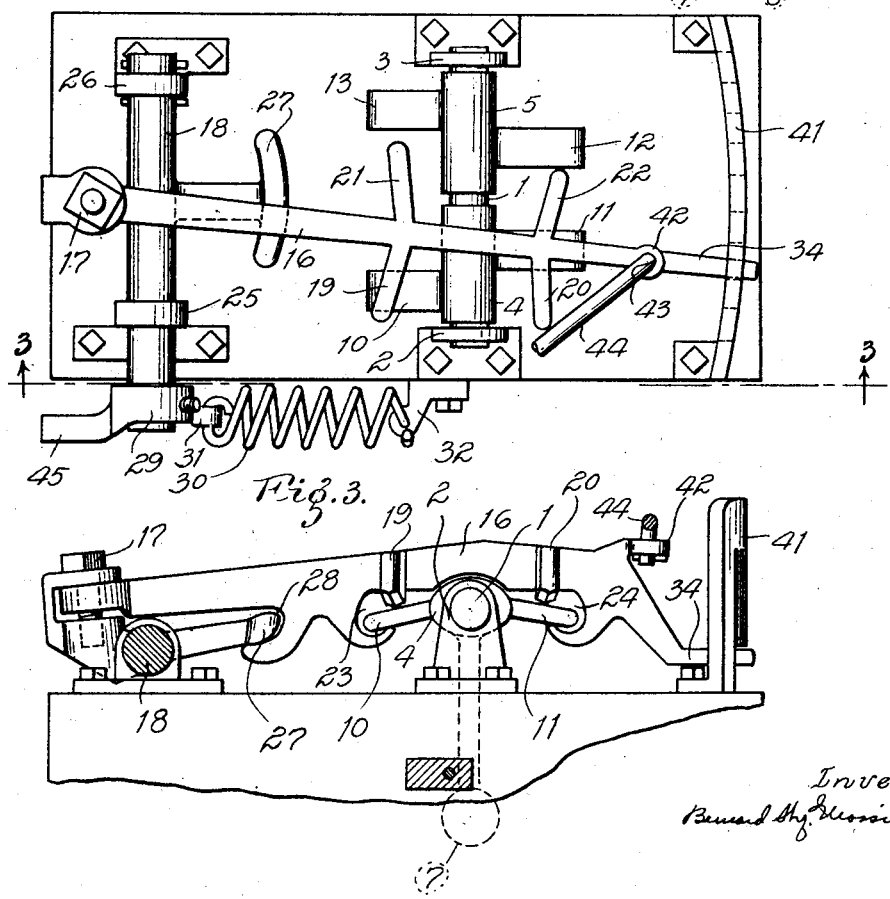
Fig.2.
Fig.3.
Inventor:
Bernard H. Mossinghoff.

March 11, 1924.

B. H. MOSSINGHOFF

AUTOMOBILE GEAR SHIFT

Filed Feb. 25, 1922

Inventor:
Bernard H. Mossinghoff

Patented Mar. 11, 1924.

1,486,447

UNITED STATES PATENT OFFICE.

BERNARD HY. MOSSINGHOFF, OF CHICAGO, ILLINOIS.

AUTOMOBILE GEAR SHIFT.

Application filed February 25, 1922. Serial No. 539,086.

*To all whom it may concern:*

Be it known that I, BERNARD HY. MOSSINGHOFF, a citizen of the United States, residing at Chicago, in the county of Cook and State of Illinois, have invented new and useful Improvements in Automobile Gear Shifts, of which the following is a specification.

This invention relates to improvements in variable speed gear shifting devices for motor vehicles.

The objects of this invention are principally: to provide in a combination clutch control and gear shift pedal means whereby slight tilting of the foot accomplishes the selection of the particular speed desired and simple ordinary forward stroke of the same foot shifts the gears; to provide in such a device means in which the gear selection need not be determined until the moment when the newly selected gears are to be meshed; to provide in combination with gear shift pedal improved and simple mechanism to actuate the selected gear shift rods; to provide a combination gear shift and clutch pedal wherein the clutch can be automatically engaged to aline the gears to enmesh in case the gear teeth abutted head-on; and to provide security against "gear-stripping".

With the above and other objects in view I have invented the device illustrated in the accompanying drawings, in which;

Fig. 1, is an elevational view of my device.

Fig. 2, is a top plan view of the shifting mechanism above the gear box.

Fig. 3, is a section on line "3—3" of Fig. 2.

Figure 6:
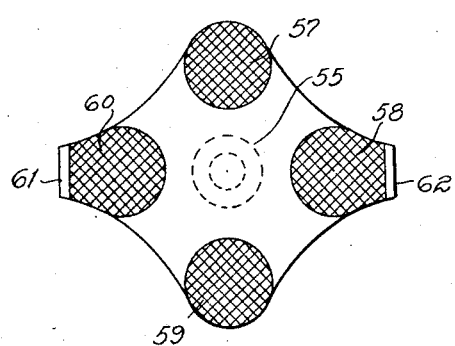

Fig. 6, as a detail view of the tiltable treadle.

Like reference characters indicate like parts throughout the following specifications and in the several views of the drawings, which show the preferred practical adaptation of the principles involved, and which includes a shaft 1, mounted on bearings 2 and 3, said shaft having pivotally mounted thereon selective gear shifting lever members 4 and 5, which member 4 embraces vertical lever arm 6, having enlarged rounded end 7, socket 8 and a gear shift rod 9, which moves the gears (not shown). A duplication of similar parts are constructed on aforesaid member 5, giving accordingly two shift rods similar to said 9, each one of which rods is longitudinally slidable in either direction from shown center position accounting for four positions in all, namely three forward speeds and one reverse. From members 4 and 5 project laterally the selection fingers 10, 11, 12 and 13, which are adapted to be selectively engaged for raising, (by projections 14 and 15 on horizontal lever 16), when moved in a horizontal plane on pivot pin 17, mounted on rocking shaft 18. Extending laterally from said lever 16 are bracket arms 19, 20, 21, and 22, the under surfaces of which are slightly convexed, to facilitate the guiding and gliding of said lever 16 over said selection fingers. The juncture of said arms 19, 20, 21 and 22 with said lever 16 form the roof of the recesses 23 and 24, whereby the respective fingers 10, 11, 12 or 13 are forced down into shown neutral positions when unmeshing the gears. Rocking shaft 18 is journaled in bearings 25 and 26, and has rearwardly extending T-shaped guide segment 27, riding in recess 28 of said lever 16, thereby assuring better cooperation when lever 16 is moved in vertical plane, carrying one of the selecting fingers 10, 11, 12 or 13 with it, upon the actual rocking of said rock shaft 18. On one extremity of said rock shaft 18 is mounted rock arm 29, having spiral contractile spring 30 attached to its extremity 31, tending to pull same towards anchoring bracket 32, firmly fastened to gear box 33. It is accordingly understood that said spring 30, if unopposed, will normally hold selecting lever 16 in raised or "gear-meshed" position.

Lever 16 is provided at its extremity with the lock finger 34, adapted to move vertically between one of the pairs of teeth 35, 36, 37, 38, 39 and 40, of the comb-shaped guide segment 41, held rigidly vertical upon the upper surface of gear box 33, and locking lever 16 against horizontal movement. At same movable end of lever 16 there is provided the annular eye member 42, into which the end 43 of connecting rod 44, which gives the selective horizontal position to lever 16, is movably mounted, and whose actuation will be explained further below.

Aforesaid rock arm 29 has an integral extension 45 for contact engagement by arm 46, revolvably mounted on bearing 47, and firmly attached to and movable with clutch pedal lever 48, and cam 49 operated thereby, and actuating clutch lever 50 through medium of anti-friction roller 51. The clutch mechanism (not shown) includes a spring which tends to hold the clutch normally engaged and presses said roller 51 continually against surface of cam 49; accordingly forward movement of pedal lever 48 disengages clutch and in most forward position it opposes tension of said spring 30, and moves selecting lever 16 down to shown neutral position.

Clutch pedal lever 48 is provided with an offset 52 at its upper extremity, the upper end of which is formed as an annular eye socket 53, through which rocking selector rod 54 passes, and in which it is universally rockable as in a ball-and-socket joint. On rear end of rod 54 is firmly mounted the tiltable treadle plate 55, and cotter pin 56 prevents slidable movement of rod 54 in said eye socket 53. Said treadle plate is provided with raised contact portions 57, 58, 59 and 60 for engagement with toe part of operator's shoe, and with side guards 61 and 62 to prevent said shoe from slipping off said treadle.

Mounted forward of pedal 48 and forward of and concealed by the foot boards of automobile is the guide plate 63, having anchoring flange 64, which is firmly held to automobile by means of bolt 65. A substantially rectangular aperture 66, through which aforesaid rocker rod 54 passes, is formed within said guide plate and has along its periphery the recesses 57', 58', 59', 60' and 67. On the forward surface of said guide plate and by means of pivot 68 is movably mounted the bifurcated member 69, having the open slot 70, in which said rock rod 54 is longitudinally and laterally slidable. The lower integral extension 71 of said member 69 carries the connecting lever 72 pivotally mounted thereon at 73, and having the lateral nibs 74 and 75, against which abut the ends of blade springs 76 and 77, firmly attached to 71 at 78 and 79, respectively. Said springs 76 and 77 being normally pressed against the sides of lever 71, tend to hold said lever 72 constantly centered in alinement with lever 71, as shown. However, whenever lever 72 is locked in position whilst lever 71 is forcibly moved by rocking rod 54, said springs temporarily take up the discrepancy in relative positions until lever 72 becomes released, and is forced by said springs to resume centered and alined position relative to lever 71. At the swinging extremity of said lever 72 is the eye 80, in which the extremity 81 of said connecting rod 44 is connected.

Figure 4:
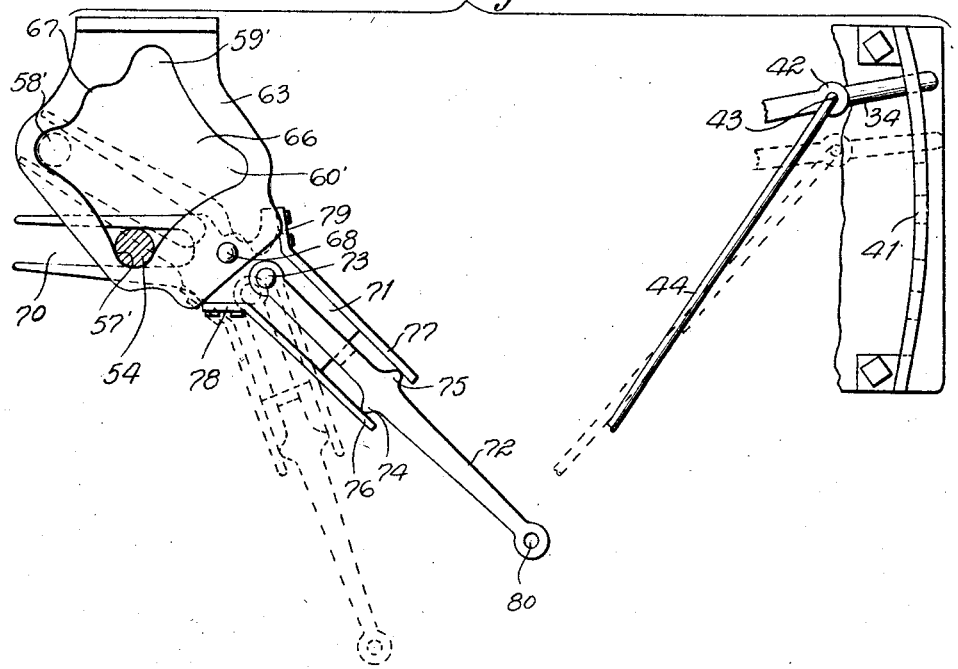
Fig. 4, is an ideal section on line "4—4" of Fig. 1.
Figure 5:
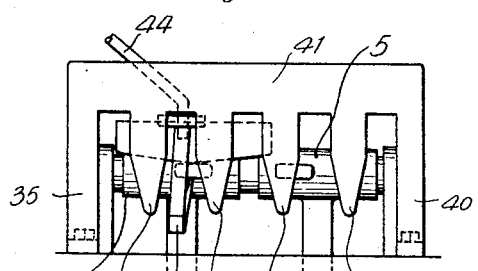
Fig. 5, is end view of selector locking device.

To understand the operation of this variable gear shift device, it is to be kept in mind that the shown position (except that of Fig. 4) is that of clutch pedal 48 forwardmost, and consequently the clutch is fully disengaged and the selecting lever 16 is in lowermost position, with consequently all gears unmeshed. Moreover in this position the spring 30 and to a small extent the clutch spring, tends to force said lever 48 backwards, which tendency however is being opposed by operator's foot pressing on plate 55. Though the pedal lever 48, having the dual functions of a clutch pedal and gear shift pedal, each one of these functions are effected during different stages of said pedal lever's motion. Namely, the first of the release or backward motion of said lever 48 allows spiral spring 30 to move rock shaft 18, raising selecting lever 16 and consequently also raising the selected finger arm 11, and moving the gear shift rod 9 rearward consequently meshing the selected gear. Further backward or release movement of said lever 48, causes roller 51 to roll on that portion of the tread of cam 49, that allows lever 50 under pressure of clutch spring (not shown) to move gradually towards bearing 47 and accordingly gradually to effect engagement of the clutch until lever 48 is fully backwards, when the clutch becomes fully engaged and the automobile proceeds with selected speed. End 34 of lever 16 has moved upwards in locked position between locked teeth 36 and 37, and arm 46 has receded away from its cooperating lever 45.

At any time during movement of automobile can the clutch be disengaged as desired, by forward motion of lever 48, until arm 46 makes contact with arm 45, which condition is readily felt by the foot because of resistance of spring 30. However, when it is desired to change and shift speed gears, said pedal lever 48 is moved forward, disengaging the clutch during first portion of its forward stroke, as explained; and after arm 46 contacts with arm 45, further forward motion forces selecting lever 16 downward, unmeshing the gear, and unlocks selecting lever 16, giving same freedom of selective motion in a horizontal plane on pivot 17. This motion is communicated to lever 16 by means of connecting rod 44, which is connected to lever 72, and hence is actuated by lever 71 and bifurcated lever 69. Hence the movement and position of said lever 16, when in unlocked position, is determined by and corresponds with the movement and position of said lever 69, which in turn is determined by position of rocking selector rod 54, which in turn is rocked and determined by selectively tilting the treadle plate 55 by means of operator's foot pressing preponderantly onto one of the selected raised portions 57, 58, 59 or 60 of plate 55, which would force rocker rod 54 into the recesses 57', 58', 59' or 60' respectively, and consequently moves selecting lever 16 for engagement over selecting fingers 13, 12, 11 and 10 respectively. Because of considerable pressure of foot a slight tilt of said treadle plate is efficient to accomplish this movement of lever 16. The recess 67 in aperture 66 is for a neutral position, and is obtained by simultaneous and substantially equal pressures of foot on portions 58 and 59, with the result of moving lever 16 midway between selection fingers 11 and 12, allowing its end 34 to rise and become locked between locked teeth 37 and 38, when pedal is released and without shifting any other gears. There are accordingly two neutral positions of the device; one when lever 16 is down, and the other when said lever 16 is raised between said locked teeth 37 and 38. It is optional to eliminate the latter and hence recess 67, by connection with the emergency brake lever. To prevent undue straining of parts, treadle 55 can be rockably tilted at any time, the blade spring 76 and 77 taking up this motion when lever 16 is locked. It also becomes evident that selection of speed need not be determined until the moment gears are to be meshed. There is a decided advantage also, in that all that is required to shift gears is for the foot to push the treadle 55 forward with preponderant pressure on one of the surfaces 57, 58, 59 or 60 throughout the whole stroke of the pedal, if desired, it not being necessary to be mindful of tilting the foot after the lever 48 has reached forwardmost position.

It is to be understood that the shown and described contrivance proffers only one form of application of the more generic principles involved, which accordingly are not to be limited to shown form.

Having described my invention, what I claim as new and desire to procure by Letters Patent, are the following:

1. In combination with a variable speed gear, a speed selecting device, including a pedal member, universally rockable into any of the positions of gear selection, independently of the actual gear-shifting movement; speed selector mechanism, actuated by said pedal member to determine the selected gear speed according to the position of said rockable pedal member; and means to shift said gears.

2. In combination with a variable speed gear, a pedal lever; a speed-selecting device, including a foot-plate mounted on said lever and universally tiltable into any of the number of positions of gear-selection, independently of the actual gear-shifting movement of said lever; and means to subsequently shift said gears.

3. In combination with a variable speed gear, a pedal lever; gear-shifting means actuated by pivotal movement of said pedal lever; a foot-plate on said pedal lever, mounted universally tiltable in respect to said lever selectively into any of the plurality of positions of gear-selection; a speed-selector mechanism actuated by tilting movement of said foot-plate and determining the selected gear speed according to the tilted position of said foot-plate; and means to shift the gears thus selected.

4. In a motor vehicle having variable speed gears, gear shifting means meshing and unmeshing said gears; and a speed selecting mechanism including a pedal member universally rockable on its bearing into any of the total number of positions of speed-selection, independently of the actual gear-shifting movement of said shifting means, and selector means actuated by rocking movement of said member and effecting selection of said gears according to said selected position of said member.

5. In a motor vehicle having variable speed gears, a clutch-control lever; a pedal member mounted thereon and universally tiltable for speed-selection into any of the plurality of speed positions independently of the actual gear-shifting movement; and speed selector mechanism actuated by said pedal member and determining the gear speed according to said selected tilted position of said pedal member.

6. In a motor vehicle, variable speed gears; a combined clutch control and gear shifting pedal lever, whereby forward motion of said lever unmeshes said gears and disengages the clutch and rearward movement of said lever meshes said gears and engages the clutch; a speed-selecting foot member mounted on said lever universally rockable in respect thereto into a plurality of positions; and speed selector mechanism, functionally actuable by said rockable movement of said foot member when said lever is in its gears-unmeshed position, the position of said foot member determining the speed gears to be meshed, by subsequent rearward movement of said lever.

7. In combination with variable speed gears, a lever or the like to shift said gears; speed selecting means mounted on, movable with and movable in respect to said lever, which means includes a plurality of selectively pressible portions, adapted for pressure engagement by the operator's foot, the first pressure against one of which portions determining the speed selection, and further pressure thereagainst in the same direction moving said lever to shift said gears.

8. In a motor vehicle having variable speed gears, a lever or the like to shift said gears; speed selecting means mounted thereon and movable with and in relation to said lever; which selecting means includes selectively engageable contact means adapted for pressure contact by the operator's foot, the movement of said foot in the same direction of motion actuating selectively said contact means for gear selection and also moving said lever to shift the selected gears.

9. In a motor vehicle having variable speed gears, a combined clutch control and gear shifting mechanism; speed selecting means mounted thereon and movable with and in relation to said mechanism; which selecting means includes selectively engageable contact means adapted for pressure contact by the operator's foot, the movement of said foot in the same direction of motion moving selectively said contact means for gear selection and also actuating said mechanism to disengage the clutch and shift said gears.

10. In a motor vehicle having variable speed gears, a pedal lever or the like, adapted by its substantially forward movement to unmesh said gears; speed selector means attached to and moving with said pedal lever; contact means on said selector means for engagement by the operator's foot and being selectively movable in respect to said pedal lever, said selective movement actuating aforesaid selector means for determining the selected speed, said contact means and said pedal being functionally operated by one and the same forward pressure stroke of said operator's foot.

11. In a motor vehicle having variable speed gears; a lever or the like to shift said gears; and a selecting mechanism to select the gears to be shifted; which selecting mechanism includes a rocker rod, given laterally rocking and also longitudinal motion by the operator's foot, and a selection communication member movable by said lateral motion of said rod for selecting the speed gears, but fixed in respect to said longitudinal motion.

12. In a motor vehicle having variable speed gears; a lever or the like to shift said gears; and a selecting mechanism to select the gears to be shifted; which selecting mechanism includes a foot member mounted on said lever, a rocker rod, given laterally rocking and also longitudinal motion by said foot member, and a selection communication mechanism actuated by said lateral motion of said rod for selecting the gears, but fixed in respect to said longitudinal motion, said lever being moved by said longitudinal motion to shift the gears.

13. In a motor vehicle having variable speed gears; a lever or the like to shift said gears; and a selector mechanism to select the gears to be shifted, which mechanism includes a foot member, a rocker rod given laterally rockable and also longitudinal motion by said foot member, means moved by said lateral motion to select the gears, and fixed check means to limit said lateral motion of said rod.

14. In a motor vehicle having variable speed gears; a lever or the like to shift said gears; and selecting mechanism to select the gears to be shifted; which mechanism includes a foot member, a rocker rod given laterally rockable and also longitudinal motion by said foot member; means moved by said lateral motion of said rod to select the gears; and guide means to direct said rod during said lateral motion into a plurality of definite positions.

15. In a motor vehicle having variable speed gears; a lever or the like to shift said gears; and selecting mechanism to select the gears to be shifted; which mechanism includes a foot member; a rocker rod given laterally rockable and also longitudinal motion by said foot member; means actuated by said rod by said lateral movement to select the gears; and fixed guide means to direct said rod during said lateral motion into a plurality of predetermined positions, said guide means being an angularly apertured member.

16. In a motor vehicle having variable speed gears; means to shift said gears; and selecting mechanism to select the gears to be shifted; which mechanism includes an operating member; a universally rockable rod given universally lateral motion by said operating member; and fixed guide means to direct said rod during said lateral motion selectively into a plurality of predetermined positions, said guide means being an angularly apertured member encompassing said rod.

17. In a motor vehicle having variable speed gears; a lever or the like to shift said gears; a pedal member actuating said lever; and a selecting mechanism to select the gears to be shifted; which selecting mechanism includes a rocker rod attached to and given laterally rockable motion by said pedal member; and an angularly apertured guide member to direct said rod during said lateral motion selectively into a predetermined position, said position determining the speed gears to be shifted.

18. In a motor vehicle having variable speed gears; a lever or the like to shift said gears; a pedal member actuating said lever; and a selecting mechanism to select the gears to be shifted; which mechanism includes a rocker rod attached to and given laterally rockable motion by said pedal member; a fixed apertured guide member encompassing said rod to guide the lateral motion of said rod; and recesses provided in the periphery of said aperture to receive and retain said rod in a selected position, said position determining the speed gears to be shifted.

19. In a motor vehicle having variable speed gears; a lever or the like to shift said gears; a pedal member actuating said lever; and a selecting mechanism to select the gears to be shifted; which mechanism includes a rocker rod attached to and given laterally rockable motion by said pedal member; a substantially quadrangularly apertured guide member encompassing said rod to guide the lateral movement of said rod into recesses provided at the angles of said aperture to receive and retain said rod in a selected position, said position determining the speed gears to be shifted.

20. In a motor vehicle having variable speed gears; an operating lever or the like; a shifting member movable into selected position and actuated by said lever to shift said gears; locking means holding said member into said selected position; and selecting mechanism to move said member into said selected position; which mechanism includes a rockable pedal member mounted on said operating lever; a rockable rod connected to said pedal member; and means to communicate said rocking motion to said shifting member to select said gears, which means includes yielding means to compensate for discrepancy in normally relative positions between said shifting member and said rod.

21. A shifting device for variable speed gears for motor vehicles, including a rockable shaft; an operating lever to rock said shaft; a selector arm mounted on said shaft and rockable therewith to shift said gears; and means to move said arm selectively into a plurality of positions in a plane perpendicular to the direction of said rocking movement; which means includes a pedal member rockably pivoted on said operating member; a rocker rod given laterally rocking motion by said pedal member; a fixed apertured guide member encompassing said rod to guide the lateral motion of said rod; recesses provided in the periphery of said aperture to receive and retain said rod in a selected position; and means communicating said lateral motion to said selector arm.

22. A shifting device for variable speed gears in motor vehicles, including a rockable lever having a vertically depending rocking arm adapted to shift different sets of speed gears selectively when rocked to either side of its normally center position; a pivot for said lever; a pair of horizontal oppositely disposed engageable finger arms on said lever to both sides of said pivot; and actuating means adapted to selectively engage either of said finger arms to rock said first mentioned arm to selectively mesh either of said sets of speed gears.

23. A shifting device for variable speed gears in motor vehicles, including a rockable lever, adapted to mesh different sets of speed gears when rocked selectively to either side of its normally centered position; a pivot for said lever; a pair of oppositely disposed engageable means on said lever to opposite sides of said pivot; a rockable shaft; actuating means to rock said shaft; a selector arm mounted on said shaft rockable therewith; engaging means on said arm to selectively engage aforesaid engageable means to rock said lever; and means to move said arm selectively into a plurality of positions in a plane perpendicular to the direction of rocking movement of said shaft; which last named means includes a pedal member mounted on said actuating means; a rocker rod given laterally rocking motion by said pedal member; and means communicating said lateral motion to said selector arm.

BERNARD HY. MOSSINGHOFF.